United States Patent Office.

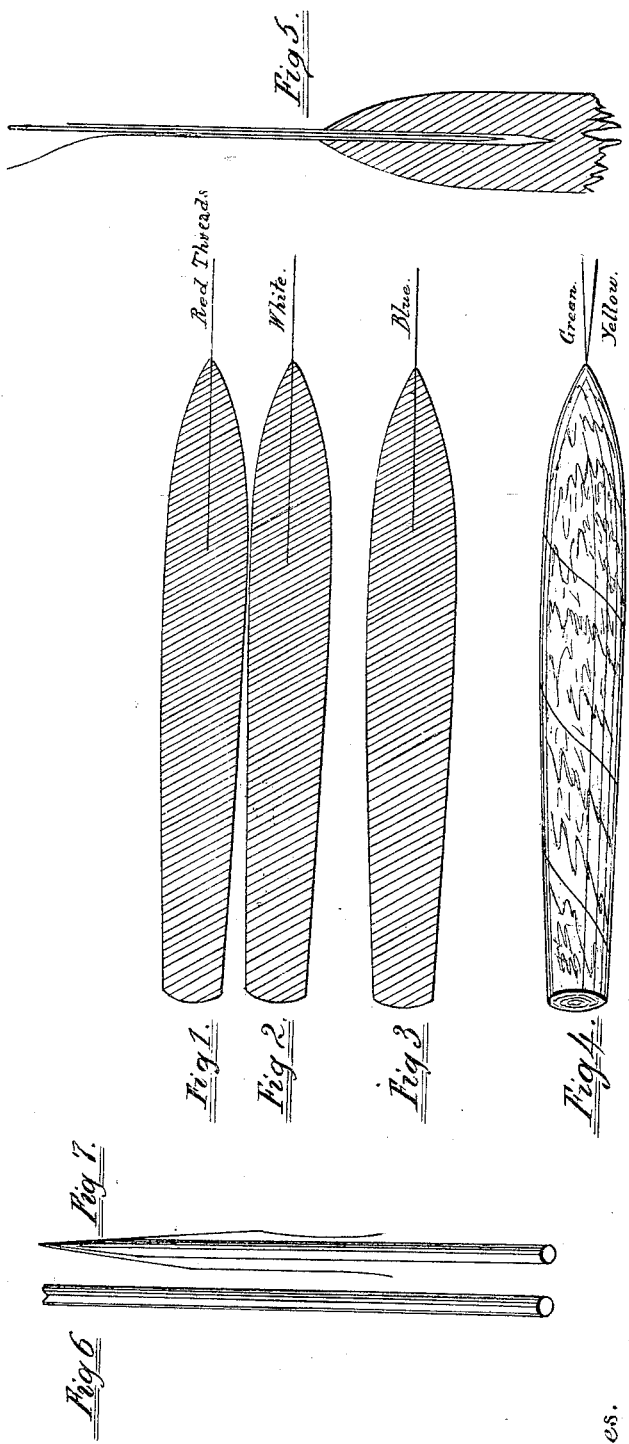

REUBEN H. ANDREWS, OF WASHINGTON, DISTRICT OF COLUMBIA.

Letters Patent No. 111,804, dated February 14, 1871.

IMPROVEMENT IN DEVICES FOR LABELING CIGARS.

The Schedule referred to in these Letters Patent and making part of the same.

I, REUBEN H. ANDREWS, of the city of Washington, District of Columbia, have invented a Device for Labeling Cigars in such a manner that any manufacturer of such articles may easily so affix said device that each cigar may be identified as the product of the maker; and It consists in inserting a thread or similar filamentous article into the end of the cigar, colored in such a manner as to indicate the quality of the cigar.

Figures 1, 2, and 3 represent sections of cigars with threads of different colors.

Figure 4 shows a cigar in perspective, with the threads attached or inserted.

Figure 5 is a view of the needle or instrument for inserting the thread, as seen when inserted in the cigar.

Figures 6 and 7 are enlarged views of the needle for inserting the thread.

Threads of various colors, inserted as shown in the drawing, may be used to indicate special brands of cigars similar to designs as a trade-mark, and the great advantage of using such a device is that any maker of cigars may affix to each article, independent of the box in which they are transported, such a device that the quality and manufacturer may both be identified.

To illustrate, a red thread may indicate a highly-flavored or strong cigar, and a white thread one of a mild quality.

These threads may also be compounded of various colors to indicate various qualities, according to the fancy of the dealer.

These threads are to be inserted by a peculiar kind of needle or instrument, shown in figs. 5, 6, and 7, which carries the thread into the cigar and leaves it there on being withdrawn.

Claim.

I claim—

The combination of threads with cigars, substantially as described, and for the purposes herein set forth.

R. H. ANDREWS.

Witnesses:
 BOYD ELIOT,
 THOMAS J. HOBBS.